United States Patent

[11] 3,591,934

| [72] | Inventor | Edgar W. Harrington<br>130 Ipswich Road, Topsfield, Mass. 01983 |
|---|---|---|
| [21] | Appl. No. | 880,575 |
| [22] | Filed | Nov. 28, 1969 |
| [45] | Patented | July 13, 1971 |

[54] TEACHING AID
8 Claims, 6 Drawing Figs.

[52] U.S. Cl. ........................................................ 35/34
[51] Int. Cl. ................................................... G09b 23/04
[50] Field of Search ............................................ 35/34, 75,
30, 31 B, 31 E; 46/122; 33/179

[56] References Cited
UNITED STATES PATENTS
1,041,059 10/1912 Fox .............................. 35/75

| 1,455,522 | 5/1923 | Cress ........................ | 35/75 |
| 3,191,318 | 6/1965 | Hoffmann ................... | 35/34 |

Primary Examiner—Wm. H. Grieb
Attorney—Morse, Altman & Oates

ABSTRACT: A teaching aid is provided for use in instructing students with respect to certain mathematical concepts and particularly to illustrate the mathematical constant $\pi$. A board is provided with a circular track and a diametrical track connected therewith. A flexible or articulated slide having a length corresponding to that of the diametrical track is mounted to be moved selectively from the circular track to the diametrical track. The board is provided with color-coded arcuate bands demonstrating the relationship between the diameter and circumference, the slide being used to determine how many times the length of the slide may be contained without overlapping in traversing the circular track.

PATENTED JUL 13 1971

3,591,934

INVENTOR
EDGAR W. HARRINGTON

BY Morse, Altman & Oates

ATTORNEYS 3,591,934

TEACHING AID

BACKGROUND OF THE INVENTION

1. Field of the Invention

This invention relates generally to teaching aids and more particularly is directed towards a board with slides movable along guideways to demonstrate the concept involved in the mathematical constant $\pi$.

2. History of the Prior Art

The concept of the mathematical constant $\pi$ often times is extremely difficult for some students to grasp and whatever success the student might have in mastering this concept heretofore has been determined to a large extent by the teacher's ability. In practice, the introduction of the term "-constant" the use of the Greek letter "$\pi$" and rapid manipulation of the equation $C/D=\pi$, all tend to obscure the simple concept of linear diameter to radial circumferential relationship.

Accordingly, it is an object of the present invention to provide a teaching aid for dynamically illustrating the concept involved in the mathematical constant $\pi$ as well as aiding in the understanding of the geometry of the circle.

SUMMARY OF THE INVENTION

This invention features a teaching aid comprising a board having a circular and a diametrical guideway communicating therewith and a flexible or articulated segmented slide mounted for movement along both guideways and to move back and forth from one to the other whereby the relationship between the diameter and circumference and thus $\pi$ may be demonstrated. The slide may also be of a length corresponding to the radius of the circle to demonstrate additional concepts.

DETAILED DESCRIPTION OF THE PREFERRED EMBODIMENT

Figure 1:
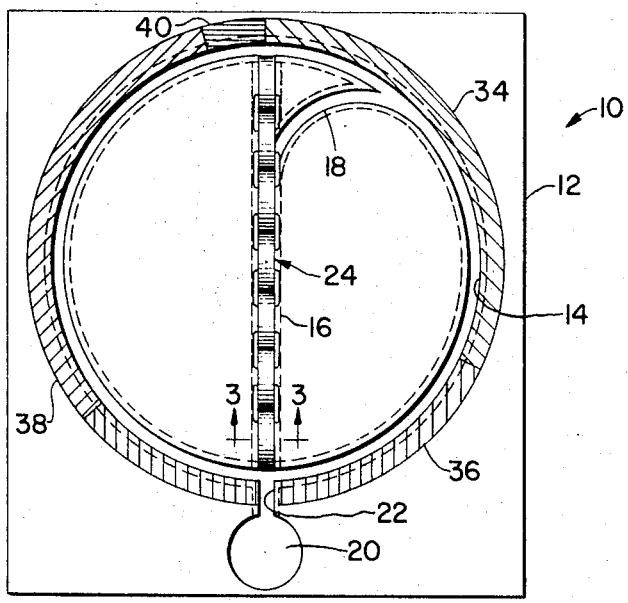
FIG. 1 is a top plan view of a teaching aid made according to the invention.

Referring now to the drawings, the reference character 10 generally indicates a teaching aid for demonstrating the mathematical constant $\pi$ and is comprised of a board 12 preferably of rectangular outline and provided on its front face with a circular track or guideway 14 defining a path about the circumference of the circle. Extending diametrically across the circle defined by the track 14 is a linear track or guideway 16 defining a path across the diameter of the circle. Connecting the diametrical track 16 to the circular track 14 is an arcuate transition track or guideway 18 the function of which will be described more fully below. Located outside of the circular track in line with the diametrical track 16 is a slide entry keyway 20 communicating with the diametrical track 16 by means of a slide track extension 22. The keyway 20 typically is in the form of a relatively small circular opening by which a slide member 24 may be mounted to the track and provide reserve backing space when moving the slide from one path to the other.

Figure 3:
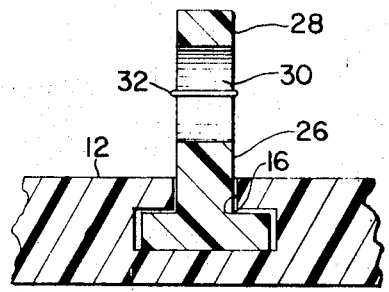
FIG. 3 is a cross-sectional view taken along the line of 3—3 of FIG. 3 is a cross-sectional view taken along the line of 3—3 of FIG. 1, and, FIGS. 4, 5 and 6 are views similar to FIG. 1 showing the slide in different positions.
Figure 2:
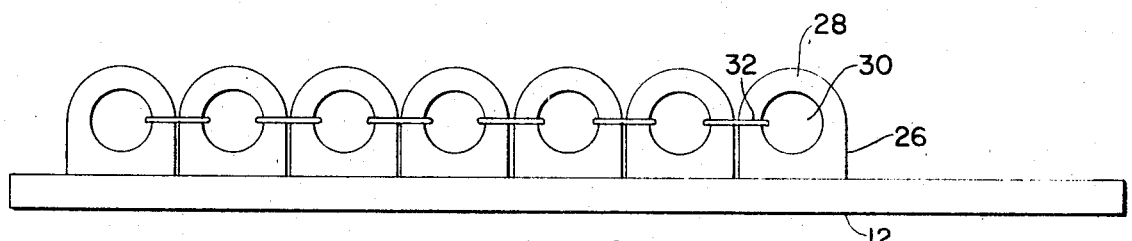
FIG. 2 is a view in side elevation thereof.

The slide 24, in the illustrated embodiment, is of a length corresponding to the diameter of the circle and may be a flexible one piece device or comprised of a plurality of articulated, segmented elements. In the illustrated embodiment the circular and diametrical tracks are formed by means of T-shaped grooves, best shown in FIG. 3, and the slide is comprised of a plurality of articulated elements 26 of T-shaped configuration slidably mounted in the cooperating T-shaped groove. These elements may be of a smooth plastic material such as nylon, each formed with an upstanding leg 28 extending out from the surface of the board 12 and having a central aperture 3 receiving a wire hoop 32 or the like by which adjacent elements 26 are joined in articulated relation. The upstanding legs 28 permit the slide 24 to be easily grasped by the student's hand for moving the slide along the tracks. It will be noted that the openings 30 are relatively large to permit one slide element at a time to be lifted out of the keyway opening 20 or inserted therein while the remaining portion of the slide is still in or out of the track.

Figure 4:
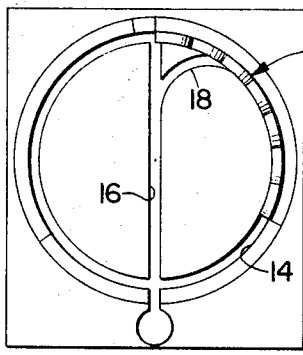
Figure 5:
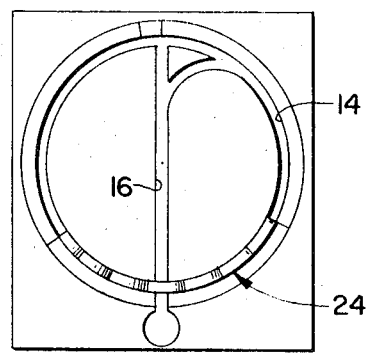
Figure 6:
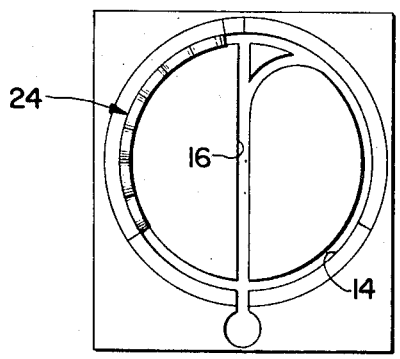

In FIG. 1 the slide 24 is shown in proper position along the diametrical track 16 for illustrating the diameter of the circle. The slide may be moved into the circular track 14 by backing the slide into the keyway so that the opposite end of the slide can be guided into the transition track 18 and then the slide may be moved through the track section 18 into the circular track 14. Preferably the board 12 is provided on its front face with color-coded arcuate bands 34, 36 and 38 and 40. It will be noted that the arcuate segments 34, 36 and 38 are of equal arcuate length while the segment 40 is a fractional part thereof. Once the slide is fully in the circular track the student may move the slide counterclockwise past the transition entrance until the left-hand end of the slide coincides with the diameter intercept (FIG. 4). The student will then observe that the slide subtends an arc equal in length to the diameter of the circle. The linear to curvilinear transposition thus providing a very effective means for demonstrating this relationship. The student then advances the slide to the next adjacent arcuate segments 36 and 38 and observes and records the number of times the diameter can be placed sequentially along the circumference. Additional boards may be employed with different sizes of circles and by manipulating a number of similar boards having different sizes of circles the student will quickly recognize the constant relationship between the diameter and the circumference of circles. The color-coded segments 34 through 40 thus graphically illustrate the meaning of $\pi$, namely, $C/D=3.1416$.

In the preferred embodiment the slide is comprised of seven elements 26 which permit identification of the fractional portion of the constant 3.1416. One such element is one-seventh which equals 0.142 or a close approximation of 0.1416.

While the invention has been described with particular reference to the illustrated embodiment, numerous modifications thereto will appear to those skilled in the art. For example, a slide having a length corresponding to the radius of the circle may be employed for use in demonstrating the relationship of the radius of the circle to other parts thereof. Also, in place of the articulated slide member a one-piece longitudinally flexible member may be employed. In addition, variations may be provided in the track configuration defining the pathway for the slide member.

Having thus described the invention what I claim and desire to obtain by Letters Patent of the United States is:

1. A teaching aid, comprising
   a. a board,
   b. a circular track on said board,
   c. a diametrical track on said board connected to said circular track, and,
   d. a slide member mounted to said track for movement from one track to another,
   e. said member having a length corresponding to the length of said diametrical track.

2. A teaching aid according to claim 1 including an arcuate transition track connecting said diametrical track to said circular track.

3. A teaching aid according to claim 2 including an extension track connected to said diametrical track and in alignment therewith.

4. A teaching aid according to claim 1 wherein said tracks are in the form T-shaped grooves formed in said board and said member is of a cooperating T-shape in cross section.

5. A teaching aid according to claim 1 wherein said board is provided with four arcuate sectors, three of equal arcuate length and the fourth a fraction thereof corresponding to 0.1416 of the length of the diametrical tracks.

6. A teaching aid according to claim 4 including a keyway formed in said board and connected to said diametrical track for selectively mounting and removing said slide from said tracks.

7. A teaching aid according to claim 1 wherein said member includes a plurality of articulated elements.

8. A teaching aid according to claim 7 wherein each of said elements is formed with a base portion and an upstanding leg portion formed with an enlarged opening and a link looped through the openings of adjacent elements.